No. 678,013. Patented July 9, 1901.
E. P. MASON.
CONTROLLING MEANS FOR MOTORS.
(Application filed Feb. 6, 1901.)
(No Model.)
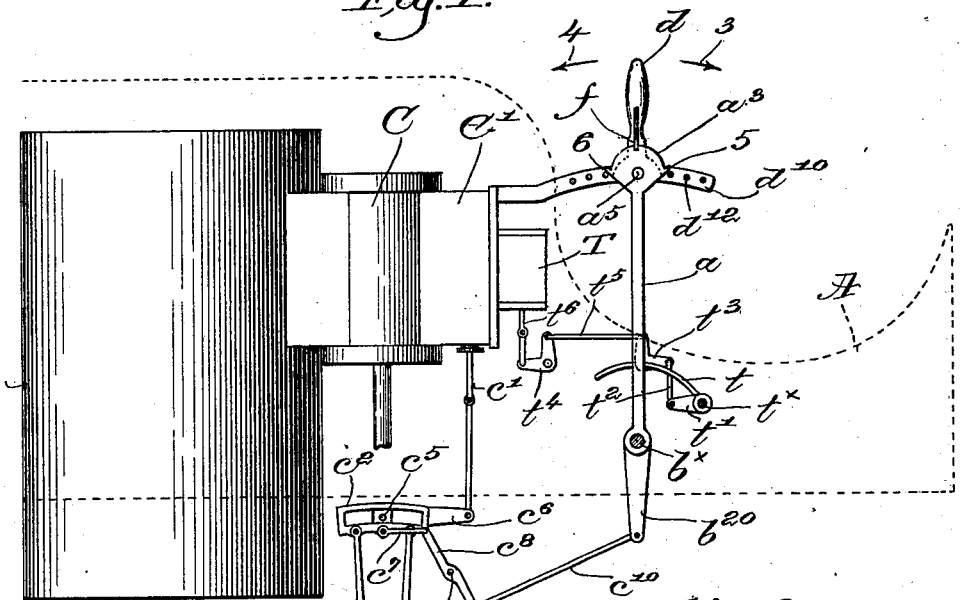
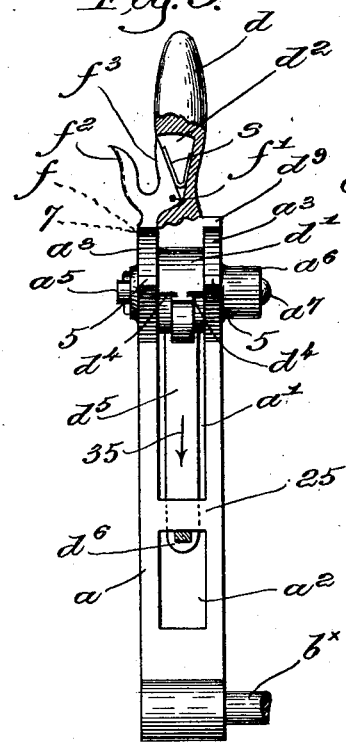
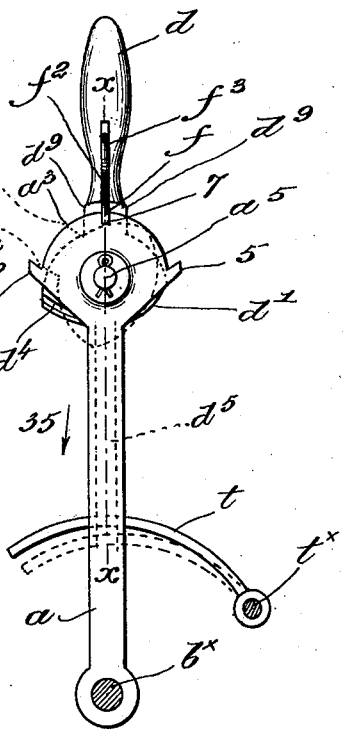
Witnesses.
Thomas J. Drummond
Adolph Haise
Inventor:
Earl P. Mason,
by Crosby Gregory
Attys.

UNITED STATES PATENT OFFICE.

EARL P. MASON, OF NEWPORT, RHODE ISLAND.

CONTROLLING MEANS FOR MOTORS.

SPECIFICATION forming part of Letters Patent No. 678,013, dated July 9, 1901.

Application filed February 6, 1901. Serial No. 46,279. (No model.)

*To all whom it may concern:*

Be it known that I, EARL P. MASON, a citizen of the United States, and a resident of Newport, county of Newport, State of Rhode Island, have invented an Improvement in Controlling Means for Motors, of which the following description, in connection with the accompanying drawings, is a specification, like letters and figures on the drawings representing like parts.

My invention relates to controlling means for steam or other motors capable of imparting to the apparatus driven thereby either a forward or backward movement, as in automobile vehicles, launches, or other apparatus which it is desirable to quickly and readily control as to its speed and its movement forward or backward. It will be manifest that the chief requisites of such controlling means are simplicity of construction and the capability of performing the desired function or functions in a manner which will accord with the natural impulse of the operator. In running an automobile vehicle, for instance, the power should be shut off before a reversal of the driving mechanism is effected, and if the vehicle is at rest the driving mechanism should be in condition to move the vehicle forward or back before the power is applied. Again, if the vehicle is running ahead and the operator wishes to stop suddenly or to go backward the natural impulse is to draw back the hand grasping the controller.

In my present invention I have devised controlling means which fulfils these conditions and which is operated by one hand of the operator, leaving the other hand free to manipulate the steering means, if the apparatus is an automobile vehicle or a boat.

Various novel features of my invention will be hereinafter described in the specification, and particularly pointed out in the following claims.

Figure 1 is a side elevation of one form of controlling means embodying my invention shown in connection with the steam-motor of an automobile vehicle. Fig. 2 is an enlarged side elevation of the controller detached. Fig. 3 is a right-hand edge view thereof partly broken out. Fig. 4 is a sectional detail on the line $x$ $x$, Fig. 2, and Fig. 5 is a detail to be referred to.

Referring to Fig. 1, the body A of a vehicle is partly shown in dotted lines provided with motive means, including an upright boiler B, steam-cylinder C, its valve-chest C', throttle T, and crank-shaft $C^\times$, driven by the motor of any suitable and well-known construction; but it is to be understood that my invention is not restricted in its use to such mechanism, the same being chosen only for the purpose of illustrating one practical application thereof. The crank-shaft operates the valve-stem $c'$ by means of one form of the well-known "Stevenson" link-motion, comprising a segmental slotted link $c^2$, actuated by or from two eccentrics $c^3$ $c^4$ on the crank-shaft, the usual block $c^5$ in the link being pivotally mounted on the rocker $c^6$, connected with the valve-stem. The eccentric $c^4$ is the one which is operative when the vehicle is running forward, and the eccentric $c^3$ operates when running backward, the link being shown in mid-position.

I have herein shown the controller as compound, comprising an upturned supporting member $a$, fulcrumed at its lower end on a suitably-supported rock-shaft $b^\times$ and adapted to be swung in a vertical plane forward or back in the direction of the arrows 3 4, Fig. 1, said member being longitudinally slotted, as as $a'$, Figs. 3 and 4, and having an elongated opening $a^2$ therein near its fulcrum. The upper ends of the two forks or arms of the member $a$ are laterally enlarged to form parallel segments $a^3$, provided at their ends with stops 5 6, and one of the segments has a central notch 7 in its curved edge. The other member comprises a handpiece or grip $d$, having an enlarged foot $d'$ inserted between the two forks of the member $a$ and mounted to rock on a headed pin $a^5$, extended through the segments $a^3$, the head entering a hollow boss $a^6$, projecting from one of the segments.

A lock, shown as a latch $f$, is mounted on the handpiece at $f'$, Fig. 3, to enter the notch 7 and hold the two members of the controller locked together, a finger-piece $f^2$ being provided when the latch is to be withdrawn from the notch, the tail $f^3$ of the latch at such time compressing a spring $s$ in the recess $d^2$ of the handpiece. Manifestly when the two members are locked together the controller can be swung bodily forward or back on its fulcrum by grasping the handpiece $d$, and if said members are unlocked the handpiece can be rocked on its pivot $a^5$ in the plane of bodily movement, and in my present invention such separate movements are utilized in governing the motor.

The link $c^2$ is shown in Fig. 1 as connected by a short rod $c^7$ with a rocker $c^8$, fulcrumed on a suitable support at $c^9$, and by swinging the rocker the link is swung forward or back from mid-position to any desired extent to vary the point of cut-off in well-known manner, and the reversing mechanism illustrated is herein operatively connected with the controller, to be actuated by bodily movement of the latter. For this purpose a rocker-arm $b^{20}$ on the rock-shaft $b^\times$ is pivotally connected by a rod $c^{10}$ with the rocker $c^8$, so that when the controller is swung forward in direction of arrow 3 the link $c^2$ will be correspondingly moved and the motor will impart forward movement to the apparatus. Similarly movement of the controller in the direction of arrow 4 will actuate the reversing mechanism to impart backward movement to the apparatus, and it will be obvious that unless the lock is released all movements of the controller will be bodily and will affect only the reversing mechanism.

Any suitable device may be employed to hold the controller at any desired point in its path of movement, and herein I have shown a fixed radius-bar $d^{10}$, having a series of depressions $d^{12}$ therein and located adjacent the end of the boss $a^6$, the latter supporting a ball or bolt $a^7$, having a rounded end and forced outward by a strong spring $s^\times$ within the boss. (See Fig. 4.) The spring operates to force the bolt into one of the depressions $d^{12}$, to thereby hold the controller in position until positively moved by the operator in one or the other direction.

I have shown the foot $d'$ of the upper member of the controller as provided with a double cam-groove $d^4$, which engages the suitably-shaped upper end of a longitudinally-movable bar $d^5$, mounted in the recess or slot $a'$ of the supporting member $a$ of the controller and having a guide-bearing 25 therein, the shape of the cam-groove being such that when the member $d\ d'$ is rocked on its fulcrum in either direction from neutral position the bar $d^5$ will be moved in the direction of the arrow 35.

In order to utilize the relative movement of the members of the controller, I have herein shown a curved arm $t$, fast on a suitably-supported rock-shaft $t^\times$, Fig. 1, and extended through a hole $d^6$ in the bar $d^5$, the arm $t$ corresponding to an arc having the fulcrum $b^\times$ of the controller member $a$ as its center, so that bodily movement of the controller will not affect the position of the arm $t$, while longitudinal movement of the bar $d^5$ will rock the said arm on its fulcrum. A second arm $t'$, fast on the rock-shaft $t^\times$, is connected by a rod $t^2$ with a bell-crank $t^3$, the latter in turn operating a second bell-crank $t^4$ by a rod $t^5$, Fig. 1, the latter bell-crank being operatively connected to the stem $t^6$ of the throttle-valve. These connections between the curved arm $t$ and the throttle are so arranged that when the arm is depressed by movement of the bar $d^5$ in the direction of the arrow 35 the throttle will be opened, corresponding to a movement of the controller member $d\ d'$ from full to dotted line position, Fig. 2, and reverse movement of the said member will operate to close the throttle.

The operation of the controller and its co-operation with the reversing and speed or power regulating mechanisms will be manifest from the foregoing description; but I wish to refer briefly to the readiness and effectiveness of the apparatus. Suppose, for the purpose of illustration, that the apparatus wherein my invention is embodied is an automobile vehicle, and referring to Fig. 1 the throttle is shown closed and the reversing mechanism on center, corresponding to mid-position of the controller. The operator grasps the handpiece $d$, the finger-piece $f^2$ of the lug being conveniently accessible to the fingers of the operator's hand, and if it is desired to start the vehicle forward the operator pushes the controller away from him or in the direction in which he desires the vehicle to travel, and such bodily movement of the controller operates to place the reversing mechanism in go-ahead position, it being noted that as yet the throttle has not been opened. The controller can be swung to any desired position, according to the point at which the link is to be set, and after such actuation of the "reversing" mechanism, as I have broadly termed it, a slight pressure of the operator's fingers unlocks the two members of the controller and a continued forward movement of the hand effects relative movement of the unlocked members, the member $d\ d'$ moving ahead until stopped by the lugs 5 engaging ears $d^9$ on the base of the handpiece, and such relative movement of the controller members will swing the curved arm $t$ and through the intervening connections open the throttle. If now with the apparatus running ahead it is desired to stop or go backward, the natural impulse of the operator is to draw the controller toward him, and such movement of the operator's hand will act to first rock the handpiece and the supporting member $a$ of the controller into full-line position, Fig. 2, so that the latch will automatically drop into the locking-notch 7, the relative movement of the controller members operating to close the throttle, and as the inward movement of the operator's hand continues the controller will be bodily moved rearwardly or in the direction of the arrow 4 until mid-position is reached, and at that point the reversing mechanism will be in neutral position. To reverse the motor, the rearward bodily movement of the controller is continued past mid-position as far back as may be desired, and the power will not be turned on until the operator unlocks the two members of the controller and effects a relative movement thereof, as hereinbefore described. The relative movement of the controller members is in the same plane as the bodily movement of said members when they are locked together.

It will be manifest that my invention is not restricted in its application to a steam or other fluid-pressure motor, as it is equally well adapted for use for electric or other motors the regulation of the speed and the direction of movement whereof it is desirable to control or to any other use wherein it is desirable to perform independent operations with one lever, and my invention is not restricted to the precise construction and arrangement herein shown nor to use with any particular character of motive mechanism, as various changes or modifications may be made without departing from the spirit and scope of my invention.

Having fully described my invention, what I claim as new, and desire to secure by Letters Patent, is—

1. In an apparatus of the class described, a throttle, reversing mechanism, including a link, a manually-operated compound controller therefor comprising two pivotally-connected members, one being supported wholly by the other, said members having a movement in unison and also a relative movement, in the same path, a single handpiece for the said controller, and operating connections between the latter and the reversing mechanism, bodily movement of the controller from neutral position operating one of the said devices, and subsequent relative movement of the members of the controller in the same path, and on their pivotal connection operating the other of said devices.

2. In apparatus of the class described, a throttle, reversing mechanism, including a link, a manually-operated compound controller the members whereof are movable simultaneously or relatively to each other, connections between the reversing mechanism and controller, operated by bodily movement of the latter, to regulate the position of the link, and independent connections between the throttle and the controller, operative by relative movement of the members of the latter at any point in its bodily path of movement.

3. In apparatus of the class described, a throttle, reversing mechanism, including a link, a compound controller having a bodily-swinging movement, to actuate the reversing mechanism and set the link at the desired point for forward or backward movement, said controller comprising two pivotally-connected members, a manually-operated lock to prevent relative movement of said members, and connections between one of said members and the throttle, operated by relative movement of the members in the plane of movement of the controller as a whole.

4. In apparatus of the class described, power regulating and reversing mechanisms, a compound controller therefor comprising a swinging support and a handpiece pivotally mounted directly upon and wholly sustained by said support, to rock in the same path, a manually-operated lock to prevent relative movement of said members, and independent connections between said mechanisms and said members of the controller, movement of the support operating one mechanism, and rocking movement of the handpiece upon the swinging support when unlocked operating the other mechanism.

5. A reversing-lever, a handpiece pivotally mounted thereon and movable relatively to said lever, means carried by the lever to limit the throw of the handpiece, means to maintain the lever at different points in its path until positively moved, a manually-controlled lock to prevent movement of the handpiece relatively to the lever, and power regulating and reversing mechanisms operated respectively by relative movement of the handpiece and movement therewith in unison with the lever.

6. A swinging lever, reversing mechanism operated by movement thereof, a handpiece pivotally mounted on the lever to rock in the plane of movement thereof and having a cam, a link in engagement with the cam and movable longitudinally of the lever when the handpiece is rocked on its fulcrum, a rock-shaft provided with a segmental arm concentric with the fulcrum of the lever and having a sliding connection with the link, whereby longitudinal movement of the latter will rock the arm and rock-shaft, power-regulating means operated thereby, and a manually-governed lock to connect the handpiece and lever, to move them in unsion.

7. In apparatus of the class described, two independent mechanisms, a manually-operated compound controller therefor the members of which have a movement in unison and also a relative movement in the same plane, and operating connections between said mechanisms and the controller, whereby such different movements of the controller are made effective to independently operate said mechanisms.

In testimony whereof I have signed my name to this specification in the presence of two subscribing witnesses.

EARL P. MASON.

Witnesses:
HARRY STEPHENSON,
F. A. STOCKWELL.